(12) United States Patent
Shatsky et al.

(10) Patent No.: US 11,921,714 B2
(45) Date of Patent: Mar. 5, 2024

(54) MANAGING INSERT OPERATIONS OF A METADATA STRUCTURE FOR A STORAGE SYSTEM

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 17/868,045

(22) Filed: Jul. 19, 2022

(65) Prior Publication Data

US 2024/0028589 A1     Jan. 25, 2024

(51) Int. Cl.
    *G06F 16/20*     (2019.01)
    *G06F 16/22*     (2019.01)
    *G06F 16/242*     (2019.01)
    *G06F 16/2457*     (2019.01)

(52) U.S. Cl.
    CPC ........ *G06F 16/244* (2019.01); *G06F 16/2246* (2019.01); *G06F 16/24573* (2019.01)

(58) Field of Classification Search
None
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |

(Continued)

FOREIGN PATENT DOCUMENTS

| | | |
|---|---|---|
| WO | 2015108670 A1 | 7/2015 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Jau Shya Meng
(74) *Attorney, Agent, or Firm* — Ryan, Mason & Lewis, LLP

(57) ABSTRACT

A storage control system manages a storage metadata structure which comprises first and second tree structures. The first tree structure is configured to accumulate metadata entries associated with newly written data items, and sort the accumulated metadata entries by index keys. The second tree structure is configured to organize metadata entries using an index structure that enables random-access to the metadata entries using the index keys. The storage control system performs a merging process to merge metadata entries in leaf levels of the first and second tree structures, and performs a tree construction process to construct a third tree structure by populating a leaf level of the third tree structure with merged metadata entries from the leaf levels of the first and second tree structures. The storage metadata structure is updated to comprise the first tree structure, and the third tree structure in place of the second tree structure.

20 Claims, 9 Drawing Sheets

(56) References Cited

U.S. PATENT DOCUMENTS

| | | | |
|---|---|---|---|
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,839,016 | B2 | 11/2020 | Wils |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 11,262,933 | B2 | 3/2022 | Matosevich et al. |
| 11,301,162 | B2 | 4/2022 | Matosevich et al. |
| 2002/0032835 | A1 | 3/2002 | Li et al. |
| 2007/0011192 | A1* | 1/2007 | Barton ............... G06F 16/288 |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2017/0221240 | A1* | 8/2017 | Stetson ............... G06F 16/9024 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2020/0311039 | A1 | 10/2020 | Gupta et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2022/0035788 | A1 | 2/2022 | Aharoni et al. |
| 2022/0113867 | A1 | 4/2022 | Aharoni et al. |
| 2022/0114184 | A1 | 4/2022 | Sharma et al. |
| 2022/0116454 | A1 | 4/2022 | Aharoni et al. |
| 2022/0121458 | A1 | 4/2022 | Moran et al. |
| 2022/0129380 | A1 | 4/2022 | Shatsky et al. |
| 2022/0171567 | A1 | 6/2022 | Matosevich et al. |
| 2022/0187991 | A1 | 6/2022 | Keller et al. |
| 2022/0222113 | A1 | 7/2022 | Shatsky et al. |

OTHER PUBLICATIONS

International Search Report and Written Opinion of PCT/US2019/024900 dated Jan. 7, 2020, 12 pages.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Dell EMC, "Getting To Know Dell EMC PowerFlex," Version 3.5.x, Rev. 02, Jan. 2021, 66 pages.
Dell EMC, "Dell EMC VxRack FLEX," Dell EMC Product Overview, 2018, 5 pages.
G. Soundararajan et al., "Dynamic Resource Allocation for Database Servers Running on Virtual Storage," FAST 2009: Proceedings of the 7th conference on File and storage technologies, Feb. 2009, pp. 71-84.
U.S. Appl. No. 17/232,203 filed in the name of Roman Spiegelman filed Apr. 16, 2021, and entitled "Object Synchronization of Server Nodes in a Network Computing Environment."
U.S. Appl. No. 17/236,256 filed in the name of Doron Tal et al. filed Apr. 21, 2021, and entitled "Recovery from Partial Device Error in Data Storage System."
U.S. Appl. No. 17/306,601 filed in the name of Rivka Matosevich et al. filed May 3, 2021, and entitled "Managing Replication Journal in a Distributed Replication System."
U.S. Appl. No. 17/308,166 filed in the name of Adi Bar Shalom et al. filed May 5, 2021, and entitled "Journal Barrier Consistency Determination."
U.S. Appl. No. 17/351,733 filed in the name of Yosef Shatsky et al. filed Jun. 18, 2021, and entitled "Data Deduplication in a Disaggregated Storage System."
U.S. Appl. No. 17/361,666 filed in the name of Yosef Shatsky et al. filed Jun. 29, 2021, and entitled "Tracking Utilization of Data Blocks in a Storage System."
U.S. Appl. No. 17/511,699 filed in the name of Yosef Shatsky et al. filed Oct. 27, 2021, and entitled "Metadata Management in Storage Systems."
U.S. Appl. No. 17/853,364 filed in the name of Yosef Shatsky et al. filed Jun. 29, 2022, and entitled "Managing Lookup Operations of a Metadata Structure for a Storage System."
U.S. Appl. No. 17/864,579 filed in the name of Yosef Shatsky et al. filed Jul. 14, 2022, and entitled "Managing Granularity of a Metadata Structure for a Storage System."

* cited by examiner

100

500

MANAGING INSERT OPERATIONS OF A METADATA STRUCTURE FOR A STORAGE SYSTEM

TECHNICAL FIELD

This disclosure relates generally to data storage management techniques and, more particularly, to techniques for managing metadata in a data storage system.

BACKGROUND

Storage systems utilize some form of internal layout for a physical data layer, and employ a mapping mechanism from a logical layer (as understood by user volumes or files) to a physical layer that is used to store data. A storage controller may arrange data in the physical layer using various methods such as, e.g., packing data to conserve capacity, implementing a log-structured array, storage tiering, etc. In addition, storage systems require various types of metadata to support core storage functionality. Such metadata includes, e.g., metadata for mapping logical locations (offset in a file or volume) to a physical location (to track the physical location of stored data items), invalidation and garbage collection related metadata, metadata for accounting, deduplication referencing, snapshot generation, and tracking relationships, and resiliency related metadata (e.g., RAID), etc. The metadata must be resilient to failures such as a device or a node going offline, because without the metadata, the stored data become inaccessible and key functionality breaks. In addition, the process of persisting metadata should not add a significant amount of bandwidth or IOPS (input/output operations per second) which degrades system performance and affects the endurance of storage devices used to store the metadata. In this regard, efficient metadata management is critical to overall performance of a data storage system.

SUMMARY

Exemplary embodiments of the disclosure include techniques for managing metadata. For example, an exemplary embodiment includes a method that is performed by a storage control system. The storage control system manages a storage metadata structure which comprises metadata entries associated with stored data items. The storage metadata structure comprises a first tree data structure and a second tree data structure. The first tree data structure is configured to accumulate metadata entries associated with newly written data items, and sort the accumulated metadata entries by index keys. The second tree data structure is configured to organize metadata entries using an index structure that enables random-access to the metadata entries using the index keys. The storage control system performs a merging process to merge metadata entries in a leaf level of the first tree data structure and a leaf level of the second tree data structure, and performs a tree construction process to construct a third tree data structure by populating a leaf level of the third tree data structure with merged metadata entries from the leaf levels of the first and second tree data structures. The storage control system updates the storage metadata structure to comprise the first tree data structure, and the third tree data structure in place of the second tree data structure.

In an exemplary embodiment, the first tree data structure comprises a log-structured merge tree data structure, and the second tree data structure and the third tree data structure each comprise a B+ tree data structure.

Other embodiments of the disclosure include, without limitation, systems and articles of manufacture comprising processor-readable storage media, which are configured for managing metadata of a storage system.

DETAILED DESCRIPTION

Figure 1:
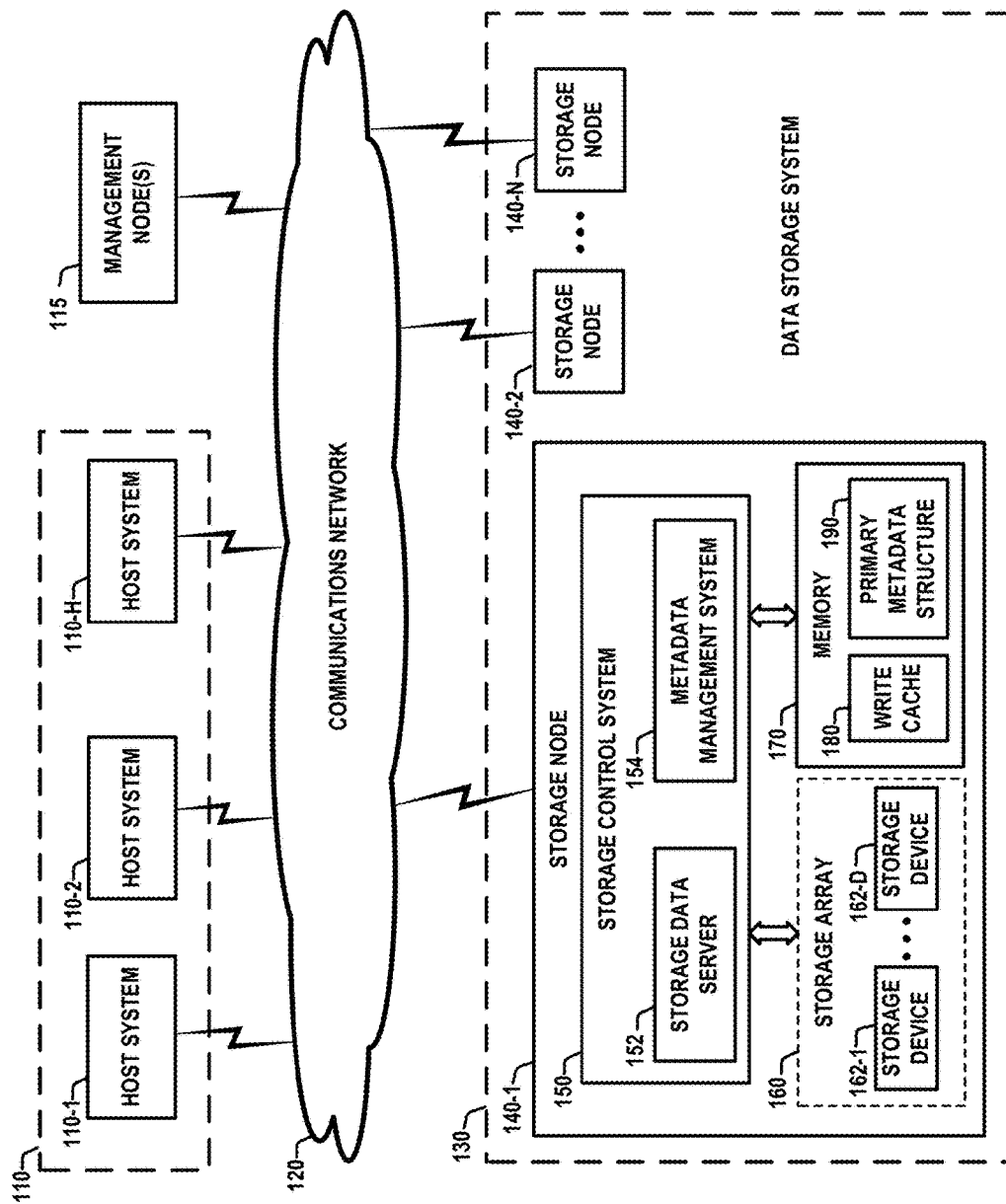
FIG. 1 schematically illustrates a network computing system comprising a data storage system which implements a metadata management system, according to an exemplary embodiment of the disclosure.

Exemplary embodiments of the disclosure will now be discussed in further detail with regard to systems and methods for managing metadata in a storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein FIG. 1 schematically illustrates a network computing system comprising a data storage system which implements a metadata management system, according to an exemplary embodiment of the disclosure. The network computing system 100 comprises one or more host systems 110-1, 110-2, . . . 110-H (collectively, host systems 110), one or more management nodes 115, a communications network 120, and a data storage system 130. The data storage system 130 comprises one or more storage nodes 140-1, 140-2, . . . , 140-N (collectively, storage nodes 140). As shown in FIG. 1, the storage node 140-1 comprises a storage control system 150, a storage array 160 (e.g., primary storage) comprising a plurality of storage devices 162-1, . . . , 162-D (collectively, storage devices 162), and primary memory 170 (alternatively, system memory 170). The primary memory 170 comprises volatile random-access memory (RAM) and non-volatile RAM (NVRAM). The storage control system 150 comprises a storage data server 152, and a metadata management system 154. The primary memory 170 is configured to implement a write cache 180 and a primary metadata structure 190 (e.g., storage metadata structure). The metadata management system 154 implements methods that are configured to provision and manage the primary metadata structure 190. As explained in further detail below, the metadata management system 154 is configured to utilize the write cache 180 and the primary metadata structure 190 to manage metadata on the storage node 140. In some embodiments, the other storage nodes 140-2 . . . 140-N have the same or similar configuration as the storage node 140-1 shown in FIG. 1.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise standalone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in the storage arrays 160 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 700, shown in FIG. 7) having processor and system memory, and possibly implementing virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes. In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of the storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprise storage nodes, which are separate from the storage control nodes. In such a configuration, the storage control nodes (e.g., storage control systems 150) are configured to handle the processing of data associated with data access requests (i.e., input/output (I/O) read and write requests), and the storage nodes (storage array 160) are configured to handle writing/reading data to/from respective storage devices 162. In a disaggregated architecture, each storage control node (e.g., each storage control system 150) would be configured to directly access data stored in each storage node (e.g., each storage array 160) in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of the storage nodes 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage nodes 140 and the storage arrays 160 are interconnected in a full-mesh network, wherein back-end interconnectivity between the storage nodes 140 and the storage arrays 160 is achieved using, e.g., a redundant high-speed storage fabric, wherein the storage control systems 150 can utilize remote procedure calls (RPC) for control messages and remote direct memory access (RDMA) for moving data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operations for recovery from errors and failures, and performing system rebuild tasks including rebalancing, etc.

The metadata management system 154 is configured to utilize the write cache 180 and the primary metadata structure 190 to manage metadata of the storage system. The write cache 180 and the primary metadata structure 190 are maintained in a persistent storage/memory resource. In the context of a software-defined storage system, the storage control system 150 is essentially a hardware independent storage control system which is configured to abstract storage and memory resources from the underlying hardware platform for greater flexibility, efficiency and faster scalability. In this regard, the storage control system 150 will have no control over the types of storage and memory hardware resources that will be utilized during run-time. In this regard, in some embodiments, the write cache 180 and the primary metadata structure 190 are implemented in primary memory 170. In other embodiments, the write cache 180 and/or the primary metadata structure 190 can be implemented in primary storage (e.g., the storage array 160).

As noted above, the primary memory 170 comprises volatile RAM such as dynamic RAM (DRAM), synchronous DRAM (SDRAM), etc. In some embodiments, the primary memory 170 comprises non-volatile memory which is configured as RAM. For example, in some embodiments, the primary memory 170 comprises a storage class memory (SCM) tier which extends the RAM that is available to the operating system of the storage node 140. The SCM tier can be implemented with various types of non-volatile memory media hardware such as persistent memory (PMEM) modules, solid-state drive (SSD) devices, nonvolatile dual in-line memory modules (NVDIMMs), and other types of persistent memory modules with a DRAM form factor, etc. In addition, the persistent memory may be implemented using a vaulting RAM system which comprises a battery-backed RAM in which data is stored to vault devices upon device or power failure. In general, the non-volatile memory devices can be accessed over a memory bus (implemented via, e.g., Peripheral Component Interconnect Express) using a suitable interface such as non-volatile memory express (NVMe).

The metadata management system 154 is configured to implement a high-performance metadata storage and processing system through use of the primary metadata structure 190. For example, the metadata is maintained and managed in such a manner that the metadata is at least as resilient as the associated data. In addition, the metadata is maintained and managed in a manner that the metadata is swappable between RAM and persistent storage. Due to the size of the metadata, the metadata may not fit within RAM in many cases. As such, the metadata management system 154 allows relevant metadata is be maintained in RAM, and then allows swapping in of metadata when the workload changes. Further, the metadata is generated and managed in a way that minimizes write overhead. For example, the persisting of the metadata does not add a significant amount of bandwidth or IOPS. In addition, the metadata management system 154 supports both random and sequential access to the metadata.

Figure 2:
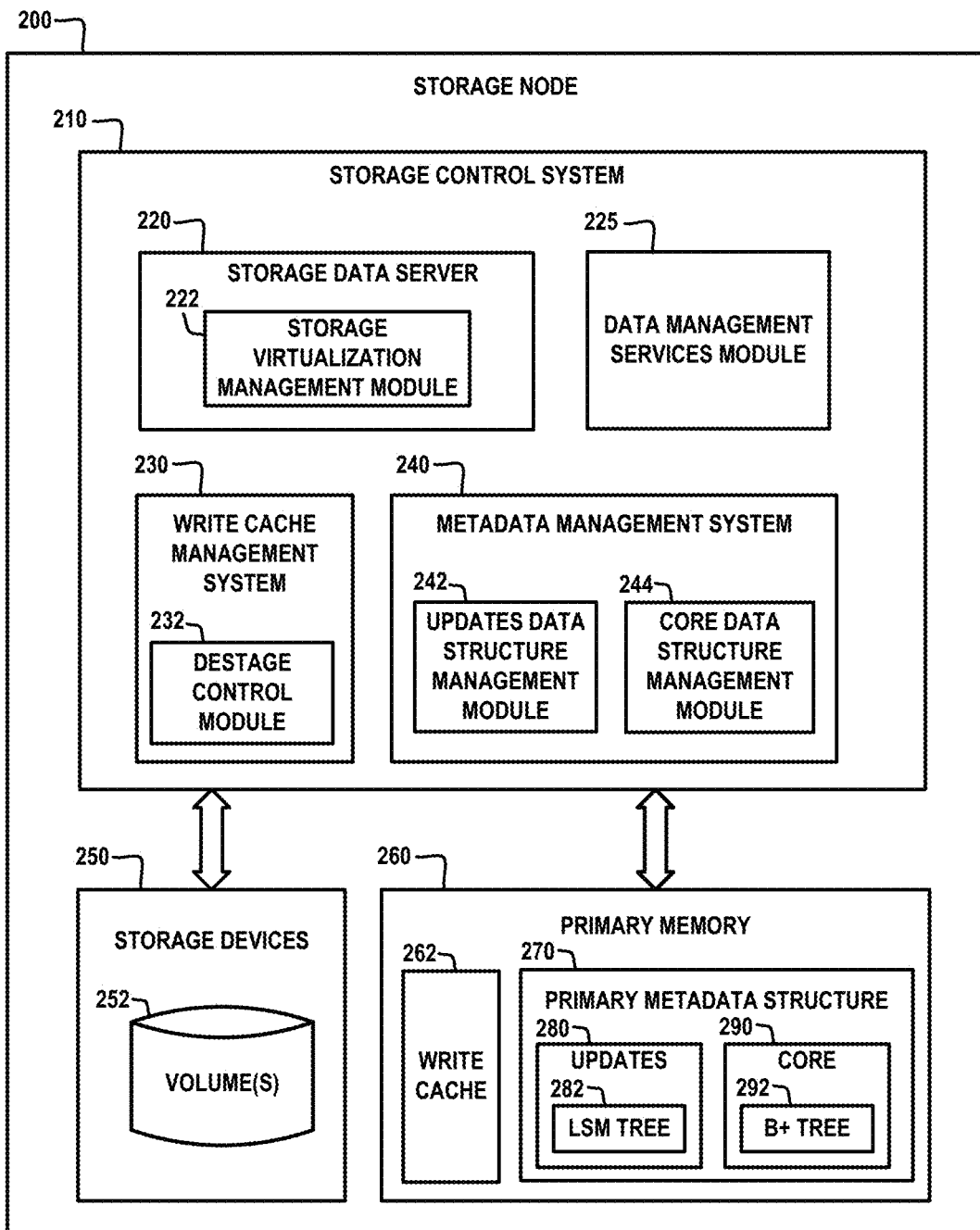
FIG. 2 schematically illustrates a storage node which comprises a metadata management system, according to an exemplary embodiment of the disclosure.

FIG. 2 schematically illustrates a storage node 200 which comprises a metadata management system, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 225, a write cache management system 230, and a metadata management system 240. The storage data server 220 comprises a storage virtualization management module 222. The write cache management system 230 comprises various functional modules including, but not limited to, a write cache destage control module 232. The metadata management system 240 comprises various functional modules including, but not limited to, a first metadata structure management module 242 (alternatively referred to herein as an "updates data structure" management module 242), and a second metadata structure management module 244 (alternatively referred to herein as a "core data structure" management module 244).

The storage node 200 further comprises an array of storage devices 250 and primary memory 260. The storage devices 250 comprise primary storage resources, wherein at least some capacity of the storage devices 250 is partitioned into one or more storage volumes 252. In the exemplary embodiment of FIG. 2, the primary memory 260 comprises a write cache 262 which is provisioned and managed by the write cache management system 230. In some embodiments, the write cache 262 resides in a region of non-volatile RAM (e.g., PMEM memory, SSD memory, etc.), which is allocated for the write cache 262. In other embodiments, the write cache 262 resides in an allocated region of the storage space of the array of storage devices 250.

As further shown in FIG. 2, the primary memory 260 comprises a primary metadata structure 270 (e.g., storage metadata structure). The primary metadata structure 270 comprises a first data structure 280 (referred to as the updates data structure 280), and a second data structure 290 (referred to as the core data structure 290). The updates data structure 280 is provisioned and managed by the updates data structure management module 242, and the core data structure 290 is provisioned and managed by the core data structure management module 244. In some embodiments, the updates data structure 280 comprises a log-structured merge (LSM) tree data structure 282, and the core data structure 290 comprise a B+ tree data structure 292, the structures and functions of which will be discussed in further detail below.

The storage data server 220 implements functions as discussed above such as processing I/O write and read requests received from host systems to write/read data to/from the storage devices 250. The storage virtualization management module 222 implements any suitable logical volume management (LVM) system which is configured to create and manage the storage volumes 252 by aggregating the capacity of the storage devices 250 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 225 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage devices 250) and presents logical (virtualized) addresses to users in the form of LUNs, the storage data server 220 generates metadata to provide mapping between logical addresses and physical addresses. In addition, the storage control system 210 generates metadata which is utilized for managing snapshots, tracking for remote replication, managing deduplication pointers, managing data compression, resiliency related metadata (e.g., RAID), etc. The metadata management system 240 manages the metadata generated by the storage control system 210.

The write cache management system 230 implements methods that are configured to provision and manage the write cache 262 in the primary memory 260 or in primary storage as provided by the array of storage devices 250. In some embodiments, the write cache 262 is utilized to serve I/O write requests by persistently storing data items (e.g., write data) together with associated metadata items in the write cache 262. In this regard, the write cache 262 reduces the overhead for handling write data and associated metadata since the write data and associated metadata is initially persisted in the write cache 262 without the need for extra I/O to store the metadata items separately from the data items. In addition, when the storage control system 210 receives an I/O write request and associated write data from a given host system, the storage control system 210 will send an acknowledgment to the host system to indicate that the write data is successfully written to the primary storage, in response to the received write data and associated metadata being stored in the write cache 262.

In some embodiments, the write cache 262 is implemented as a cyclic buffer, wherein items (e.g., data items and metadata items) are always written to a head location of the write cache 262, and items are destaged from a tail location of the write cache 262. With this scheme, the items in the write cache 262 are arranged in a cyclic write order from the tail location of the write cache 262 to the head location of the write cache 262. Further, in some embodiments, the write cache management system 230 utilizes a plurality of pointers in conjunction with the write cache 262 (e.g., cyclic write cache) to (i) determine the tail location and the head location of the write cache 262, (ii) determine a location in the write cache 262 from where to begin a recovery process, and to (iii) keep track of the data items and metadata items that are destaged from the tail of the write cache 262 via destage operations performed by the write cache destage control module 232.

More specifically, the write cache destage control module 232 implements write cache eviction/destaging operations which take into consideration that the write cache 262 comprises both data items and associated metadata items, which are separate entities that are persisted in different primary data structures. In some embodiments, the write cache destaging operations are configured to destage data items and destage metadata items, separately, based on associated eviction/destaging policies. For example, the metadata items destaged from the write cache 262 are persisted in the primary metadata structure 270 using techniques as discussed in further detail below.

The metadata management system 240 utilizes the write cache 262 in conjunction with the primary metadata structure 270 to persist, manage, and access metadata maintained by the storage node 200. Collectively, the write cache 262 and the primary metadata structure 270 provide a high-performance data structure that enables efficient management of metadata in the storage system. Various techniques for high-performance metadata management will now be discussed in further detail in conjunction with FIGS. 3-6C.

Figure 3:
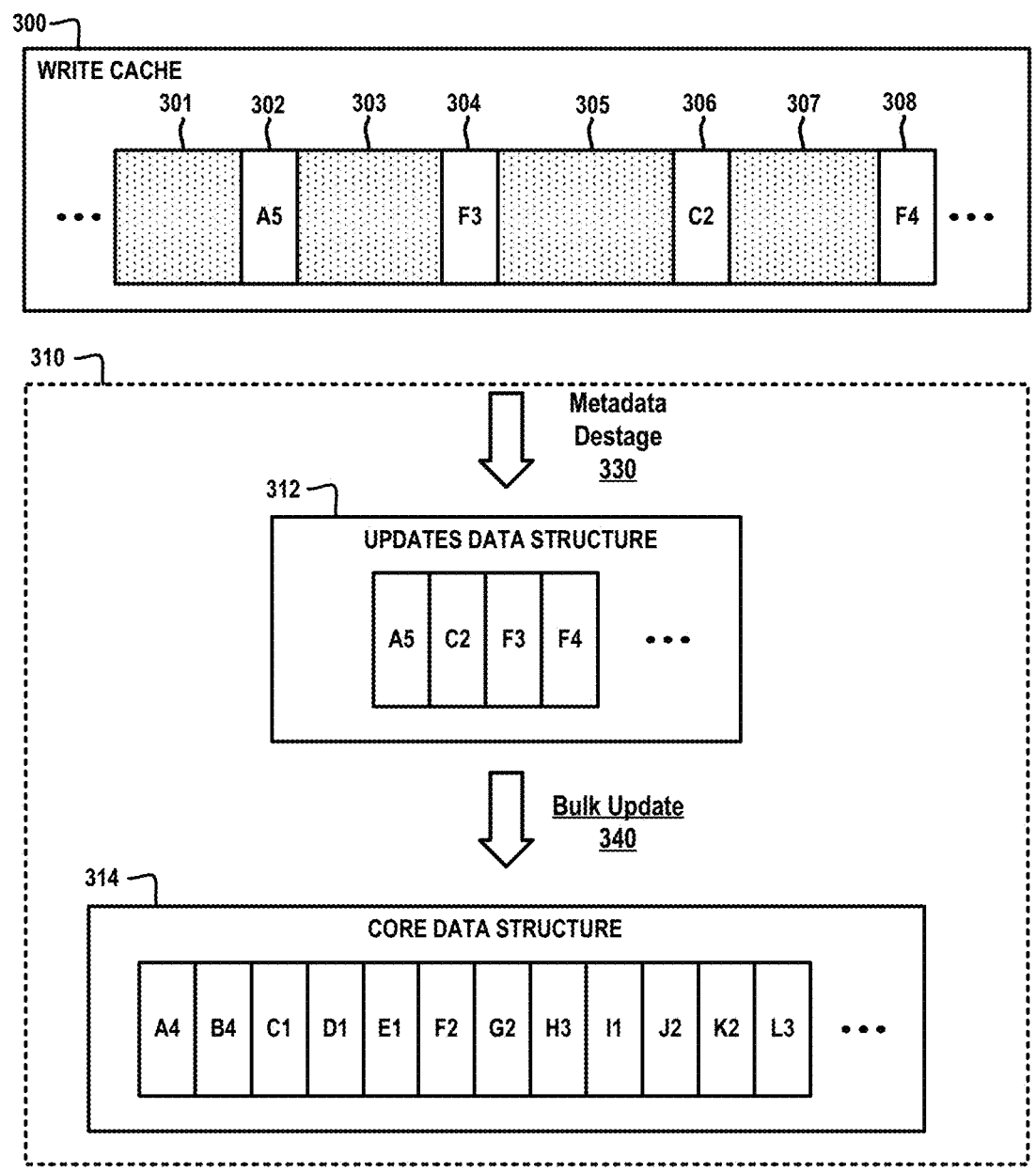
FIG. 3 schematically illustrates a process for utilizing a high-performance data structure for managing metadata in a storage system, according to an exemplary embodiment of the disclosure.

For example, FIG. 3 schematically illustrates a process for utilizing a high-performance data structure for managing metadata in a storage system, according to an exemplary embodiment of the disclosure. More specifically, FIG. 3 schematically illustrates a write cache 300, and a primary metadata structure 310 (e.g., storage metadata structure). The primary metadata structure 310 comprises an updates data structure 312, and a core data structure 314. As noted above, the write cache 300 is configured to initially persist data items (e.g., write data of I/O write requests) and metadata items to thereby serve I/O write requests with a minimal delay, and allow the storage control system 210 to return an acknowledgment to a host system when the write data of an I/O write request and associated metadata is successfully written to the write cache 300.

As shown in FIG. 3, the write cache 300 comprises a plurality of data items 301, 303, 305, and 307, and a plurality of associated metadata items 302, 304, 306, and 308. In the illustrative embodiment of FIG. 3, each metadata item 302, 304, 306, and 308 is labeled by a letter and a number. For instance, the metadata item 302 is labeled A5, the metadata item 304 is labeled F3, the metadata item 306 is labeled C2, and the metadata item 308 is labeled F4. The letter of a given metadata item represents a location of the data item (e.g., an offset in a file or volume, or an object ID) associated with the given metadata item, and the number represents a consecutive order of update of the data item (e.g., A5 denotes a next change to A4 for location "A"). In other words, the number represents a generation (or revision) number of the given data item. In an exemplary embodiment in which the allocation units (i.e., fixed-size addressable units) of the storage devices have a fixed "allocation unit size" of, e.g., 8 KB, and the letters represent offset locations in a given volume, then the following representations may apply: A→offset 0, B→offset 8 KB, C→offset 16 KB, D→offset 24 KB, E→offset 32 KB, etc.

Since writes to the write cache 300 are acknowledged to the host, the write cache 300 is configured to serve read requests for the cached data items that have not yet been destaged to the primary storage. To serve reads, the data in the write cache 300 must have lookup capabilities. However, the write cache 300 is optimized for writes and not for reads and, thus, the metadata in the write cache 300 is not random access. The lookup capability is provided by the updates data structure 312 and the core data structure 314. In other words, the primary metadata structure 310 provides a joint metadata structure to access data items in the write cache 300 before the data items are destaged and stored to primary storage (e.g., HDD/SSD primary storage devices of the storage system), as well as to access data items after they are destaged from the write cache 300 and stored to primary storage.

As noted above, in some embodiments, the write cache 300 is located on the same storage device as the data, while in other embodiments, the write cache 300 is allocated in a region of a persistent memory. In such instances, metadata is required to access both the primary storage and the write cache 300. The updates and core data structures as discussed herein are utilized to refer to storage and cache interchangeably. A data item that was originally placed in the write cache may be destaged, involving an update to a metadata item, using all the same structures. This is enabled by the ability to persist micro updates with negligible I/O overhead.

The updates data structure 312 is configured to accumulate changes to metadata and provide write amortization to the core data structure 314. As shown in FIG. 3, the metadata items in the write cache 300 are added to the updates data structure 312 by performing a metadata destage operation 330 under control of the write cache destage control module 232. The metadata destage operation 330 involves writing copies of the metadata items in the write cache 300 to an in-memory buffer in RAM, which is allocated to the updates data structure management module 242 for temporarily buffering cached metadata items before persisting the metadata items in the updates data structure 312. When the in-memory buffer becomes full (e.g., the number or amount of metadata items in the buffer reaches a predetermined buffer size), the metadata items are persisted to the updates data structure 312. During the metadata destage operation 330, resiliency of the metadata items is provided by the write cache 300 until the buffered metadata items are persisted in the updates data structure 312. Once the metadata items are persisted in the updates data structure 312, the cached metadata items are no longer needed, and can be removed from the write cache 300.

As shown in FIG. 3, the data and associated metadata items in the write cache 300 are arranged in a temporal order based on, e.g., an order in which user writes are received by the storage control system. In other words, assuming that the letters (e.g., A, F, C, F, etc.) of the data items and associated metadata items represent offset location in volume, the items in the write cache 300 are not arranged in "alphabetic order" but instead are arranged in temporal order. However, when the metadata items are destaged from the write cache 300 and persisted in the updates data structure 312, the metadata items are arranged in the updates data structure 312 in a sorted manner (e.g., alphabetical order) to facilitate indexing and searching of the metadata items.

To enable lookup using the updates data structure 312, the internal ordering of the updates data structure 312 is the same as the internal ordering of the core data structure 314 in that both data structures 312 and 314 utilize the same key (e.g., the keys (letters) which represent the offset positions in a given volume). In some embodiments, to support swapping of metadata, the updates data structure 312 comprises pages, each of which may or may not be in the system RAM. Each page comprises a unit of capacity that is allocated to store metadata items. For example, in some embodiments, the page size for the updates data structure 312 can be 512 bytes, 1,024 bytes (1 KB), 2,048 bytes (2 KB), 4,096 bytes (4 KB), 8,192 bytes (8 KB), etc.

The core data structure 314 is a metadata storage and indexing structure, which is configured to contain all the metadata except the most recent metadata that is contained in the updates data structure 312. The core data structure 314 is essentially a semi-static data structure since all metadata updates are first accumulated in the updates data structure 312, and then eventually persisted to the core data structure 314 using a bulk update operation 340, as schematically shown in FIG. 3. The updates data structure 312 essentially serves as a journal which persists and accumulates most recent changes of the metadata items, and then over time, the metadata is sorted into the core data structure 314. The bulk update operation 340 is occasionally performed to apply metadata updates from the updates data structure 312 to the core data structure 314. The occasional bulk update operation 340 leads to large-scale changes to the core data structure 314, which allows for many optimizations including, but not limited to, write amortization, tree balancing, removal of deleted items, constructing new inner nodes of the core data structure 314 when write-in-place is avoided.

In some embodiments, the updates data structure 312 is implemented using an LSM tree data structure, and the core data structure 314 is implemented using a B+ tree data structure. The combined use of the LSM tree and B+ tree data structure provides a high-performance data structure for managing metadata. More specifically, the B+ tree data structure is utilized to implement a primary lookup and address mapping functionality, while the LSM tree data structure is configured to provide write amortization for metadata updates (e.g., adding new metadata items, modifying metadata items, deleting/invalidating metadata items. The LSM tree data structure allows for low-latency writing of metadata to a persistent data structure using out-of-place updates in which metadata items (new metadata items, updated metadata items) are always stored to new locations instead of overwriting old entries (eliminating the need for random I/Os for writes). The LSM tree data structure enhances write performance for persisting the metadata since the LSM tree data structure can exploit sequential I/Os to handle a high rate of write operations and, thereby, allow metadata to be quickly persisted to support high-throughput writes. In addition, the LSM tree data structure comprises a multilevel tree-like structure which is configured to progressively store key-value pairs associated with metadata items to enable read access to the metadata items using binary searches, indexing structures, Bloom filters, etc.

The B+ tree data structure implements a metadata storage and indexing structure, which is configured to contain all the metadata except the most recent metadata updates that are accumulated in the LSM data structure. The B+ tree data structure is optimized for read access to metadata items as the B+ tree data structure allows random or sequential I/O access to the metadata items. However, a B+ tree data structure is not optimized for write operations, as the B+ tree data structure is typically configured for in-place updates in which old records are overwritten to store new updates. In this regard, the use of a B+ tree data structure alone to manage metadata would sacrifice write performance, as updates to the B+ tree data structure incur random I/Os as every write to the B+ tree data structure has to perform multiple write operations including a write of the given record, as well as performing required metadata updates to the B+ tree data structure with regard to moving, splitting and merging nodes in the B+ tree data structure, whereby resulting in slower writes. In this regard, the LSM tree data structure is utilized to accumulate metadata changes with high write performance, and heavily buffer such metadata changes for subsequent addition to the B+ tree data structure using bulk update operations outside the I/O processing path. Exemplary embodiments of LSM and B+ tree data structures will be discussed in further detail below in conjunction with FIGS. 4, 5, and 6A-6C.

Figure 4:
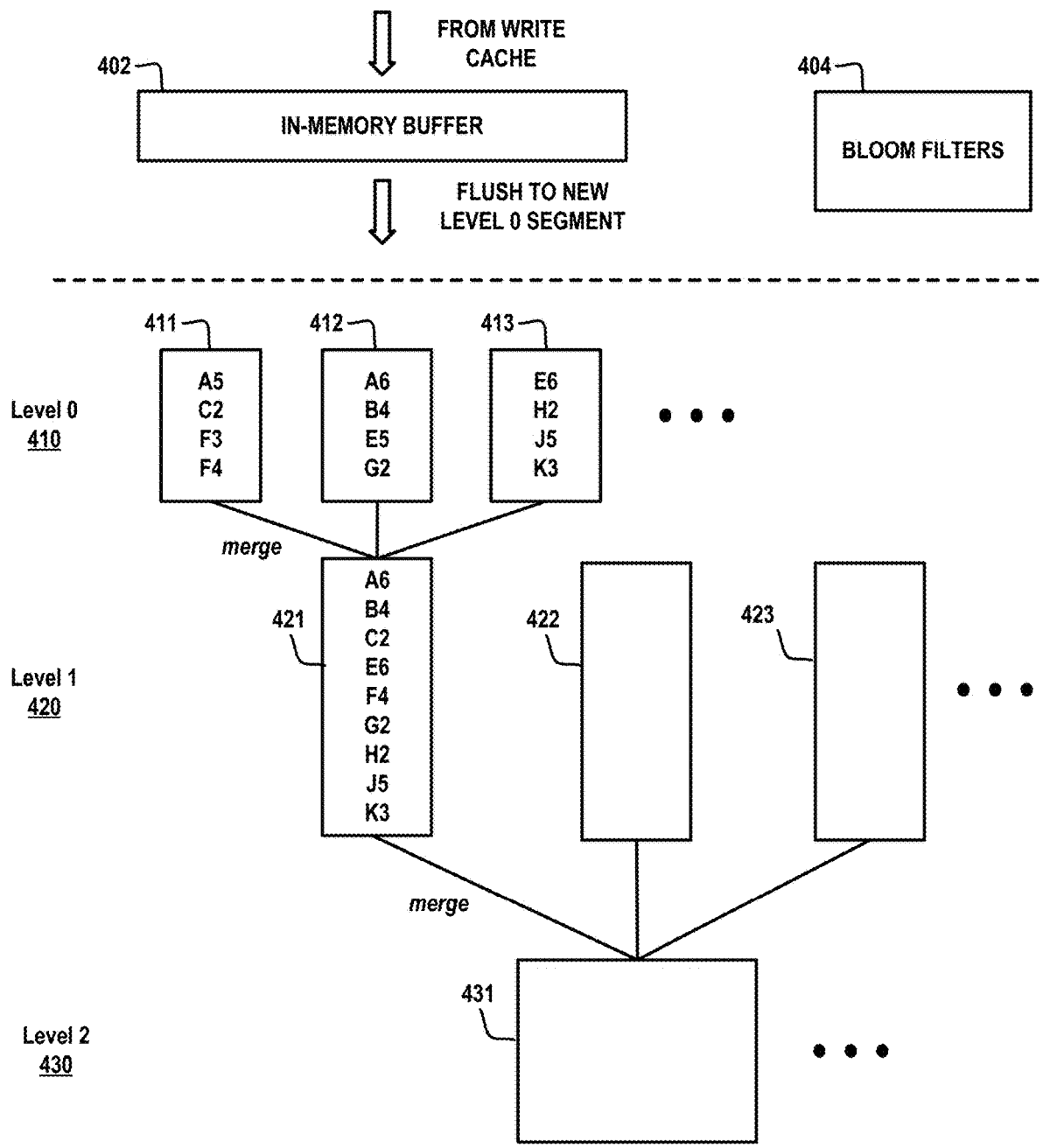
FIG. 4 schematically illustrates an exemplary log-structured merge tree data structure which is utilized to implement a high-performance data structure for managing metadata in a storage system, according to an exemplary embodiment of the disclosure.

FIG. 4 schematically illustrates an exemplary LSM tree data structure 400 which is utilized to implement a high-performance data structure for managing metadata in a storage system, according to an exemplary embodiment of the disclosure. The exemplary LSM tree data structure 400 implements an in-memory buffer 402, and comprises Bloom filters 404, and a multilevel structure comprising a plurality of segment levels, e.g., Level 0, Level 1, and Level 2. The LSM tree data structure 400 is configured to enable write amortization for accumulating changes to metadata items (e.g., adding new metadata items, updating metadata items, and deleting metadata items) which are first written to the persistent write cache.

The in-memory buffer 402 comprises an in-memory structure that buffers metadata items that are destaged from the write cache. As noted above, metadata items in the write cache are destaged by copying the metadata items to the in-memory buffer 402. In some embodiments, the metadata items are inserted into the in-memory buffer 402 and sorted in order (e.g., by offset location, and generation number). When the in-memory buffer 402 reaches a predefined threshold size (e.g., allocation unit size, page size, etc.), the accumulated metadata items within the in-memory buffer 402 are flushed to a Level 0 segment of the LSM tree data structure 400.

For example, as shown in FIG. 4, the LSM tree data structure 400 comprises a plurality of Level 0 segments 410 (or root segments) comprising a first segment 411, a second segment 412, a third segment 413, etc. Each Level 0 segment 410 comprises a persistent immutable data structure which stores a plurality of metadata items that are flushed from the in-memory buffer 402 at a given time. The process of updating the LSM tree data structure 400 prevents a high rate of updates to the Level 0 layer of the LSM tree data structure 400 by accumulating metadata changes (e.g., hundreds) in the write cache before the metadata items are written persistently from the in-memory buffer 402 to new Level 0 segment at once. Once the metadata items are persisted in a Level 0 segment 410, the metadata items in the write cache can be deleted.

More specifically, in the exemplary embodiment of FIG. 4, the first segment 411 comprises sorted metadata items (A5, C2, F3, F4), the second segment 412 comprises sorted metadata items (A6, B4, E5, G2), and the third segment 413 comprises sorted metadata items (E6, H2, J5, K3). While FIG. 4 shows each Level 0 segment 410, 411, and 412 having four (4) metadata items for ease of illustration, each Level 0 segment 410 can have hundreds of metadata items (e.g., the Level 0 segments 411, 412, and 413 can each have a size of 8 KB (similar to the allocation unit size, or page size, etc.)). The first segment 411 comprises metadata items F3 and F4 where F4 denotes a recent change to data at offset location F from the previous version F3. In addition, the first and second segments 411 and 412 include respective metadata items A5 and A6, where A6 denotes a recent change to data at offset location A from the previous version A5. Further, the second and third segments 412 and 413 include respective metadata items E5 and E6, where E6 denotes a recent change to data at offset location E from the previous version E5.

In this regard, the updated metadata items are written out-of-place by appending an update to the same or a new Level 0 segment as cached metadata items in the write cache are added to the LSM tree data structure 400. The older values for metadata items are removed at a later point in time through merge operations (or compaction operations). In the event of a crash while metadata items are still in the in-memory buffer 402, the write cache will be used to recover on the next restart.

The Level 0 segments 410 are continuously generated as more blocks of cached metadata items are flushed from the in-memory buffer 402. Periodically, multiple segments in a given Level (i) of the LSM tree data structure 400 are merged together into a single segment that is added to the next Level (i+1). The merging is performed to, e.g., reduce the number of segments that need to be searched. For example, as shown in FIG. 4, the LSM tree data structure 400 comprises a plurality of Level 1 segments 420 including a first segment 421, a second segment 422, a third segment 423, etc., and a plurality of Level 2 segments 430 comprising a first segment 431, etc.

In the exemplary embodiment shown in FIG. 4, the segments 411, 412, and 413 of the Level 0 segments 410 are merged together into the first segment 421 in Level 1 of the LSM tree data structure 400. The first segment 421 in Level 1 aggregates the metadata items from each of the Level 0 segments 411, 412, and 413, and stores the metadata items in a sorted order. Following the merge operation, the Level 0 segments 411, 412, and 413 (source segments) are removed from the LSM tree data structure 400. While not specifically shown in FIG. 4, the second and third segments 422 and 423 in Level 1 of the LSM tree data structure 400 could each have a plurality of sorted entries aggregated from merging different blocks of three segments in Level 0 of the LSM tree data structure 400. Moreover, the first segment 431 in Level 2 of the LSM tree data structure 400 could have a plurality of sorted records as a result of merging the segments 421, 422, and 423 in Level 2 of the LSM tree data structure 400. The LSM tree data structure 400 uses very few writes to propagate entries from one level to the next by merging segments.

In some embodiments, each segment in the LSM tree data structure 400 is stored as a file, wherein the metadata items in a given segment are divided into fixed size pages (e.g., 8 KB blocks) of the file. More specifically, in some embodiments, each segment in each level of the LSM tree data structure 400 is divided into one or more pages which facilitates access, memory allocation, persistency, and swapping segments or portions of segments in and out of memory. For example, assume that each Level 0 segment 410 has a size equivalent to a page size (e.g., 8 KB), the segments of higher levels (e.g., Level 1, Level 2, etc.) will be increasingly larger in size and have multiple pages.

The pages are used for purposes of memory allocation and to facilitate lookup for a target metadata item in the LSM tree data structure 400. For example, each segment can have additional metadata with regard to the page(s) of the segment, wherein such metadata comprises a page key for each page in the segment, and an associated value which represents the key (e.g., offset location) of the first metadata item within the given segment. To locate a given entry in a given segment, the segment may include a page index which records a key of the first entry in each page. The page index together with the Bloom filters 404 provides for fast searching of metadata items in the LSM tree data structure 400.

In particular, when searching for a given metadata item which may be located in a given segment of the LSM tree data structure 400, the Bloom filters 404 will be used initially to enable efficient per-segment lookup. A Bloom filter for a given segment provides an indication that (i) the given segment may contain a key that is being searched for with a high probability, or that (ii) the given segment does not include the key that is being searched. In some embodiments, if a given segment is identified (via Bloom filtering) to likely have the target key, a binary search can be conducted to find and access the key within the given segment (if the key does in fact exist in the given segment). In some embodiments, for large sized segments, once a given segment is identified (via Bloom filtering) to most likely contain the target key, the page index for the given segment can be used to identify the page within the given segment which would have the key (if the key was indeed in the segment). Once the target page in the given segment is identified via the page index, the page can be loaded to memory and to perform a binary search of the keys in the target page to find the target key. In this regard, the first key of each page is maintained in RAM to reduce the search within a segment to a single page utilizing the fact that the segments are sorted.

Figure 5:
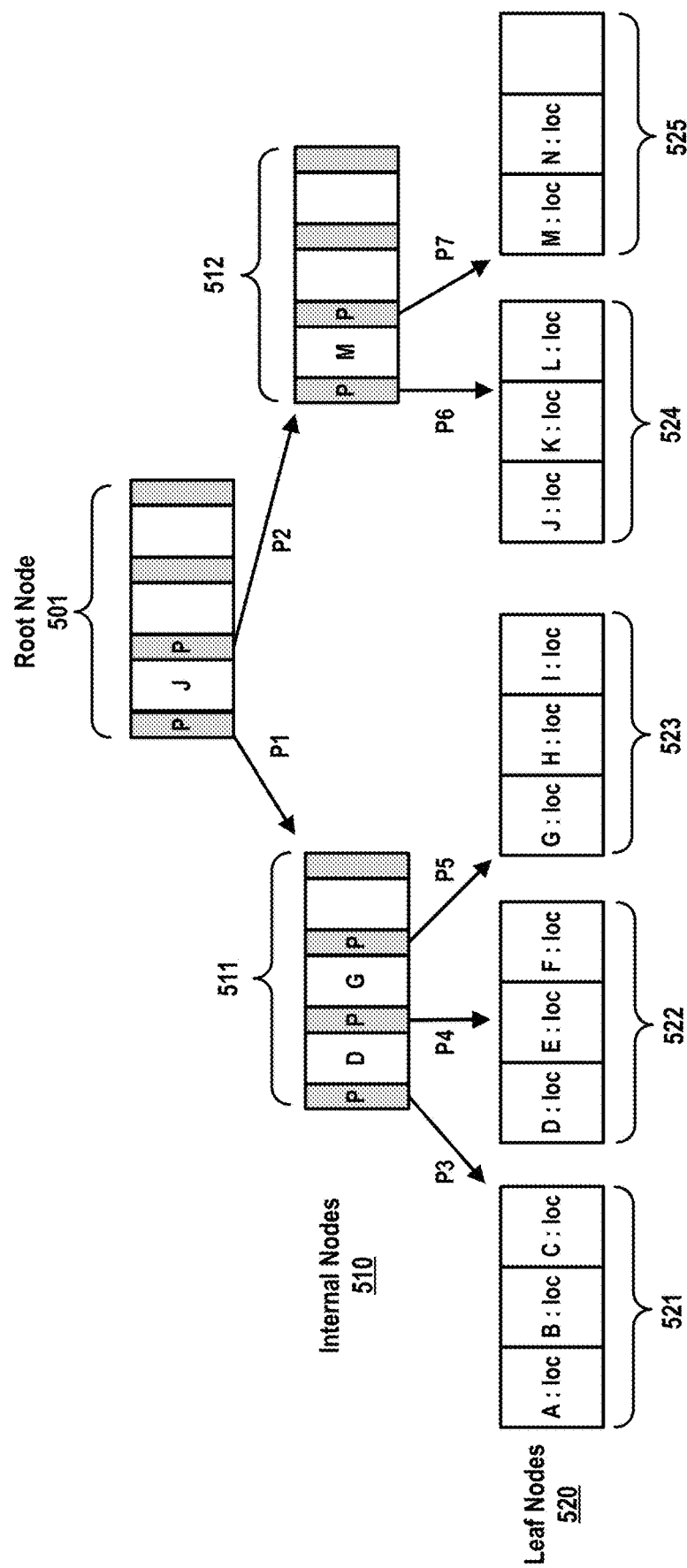
FIG. 5 schematically illustrates an exemplary B+ tree data structure which is utilized to implement a high-performance data structure for managing metadata in a storage system, according to an exemplary embodiment of the disclosure.

FIG. 5 schematically illustrates an exemplary B+ tree data structure which is utilized to implement a high-performance data structure for managing metadata in a storage system, according to an exemplary embodiment of the disclosure. In particular, FIG. 5 schematically illustrates an exemplary B+ tree data structure 500 comprising three levels of nodes including a root level comprising a root node 501, an internal node level 510, and a leaf node level 520. The internal node level 510 comprises two internal nodes 511 and 512, and the leaf node level 520 comprises five leaf nodes 521, 522, 523, 524, and 525, wherein all leaf nodes are in the same level of the B+ tree data structure 500. For ease of illustration, FIG. 5 depicts an exemplary B+ tree data structure 500 which is configured, at a given point in time, to enable random access to stored data items in fourteen (14) offset locations identified by metadata keys A, B, C, D, E, F, G, H, I, J, K, L, M and N.

Furthermore, for ease of illustration, the exemplary B+ tree data structure 500 is an n-order tree structure, wherein n=3. The "order" of a B+ tree data structure denotes a maximum number of key fields that a given node can have. For n=3, the internal nodes and leaf nodes can have at most n=3 key fields and n+1=4 pointer fields. In addition, when n=3, each leaf node must have a least two (2) entries, and each non-leaf node must have at least one (1) entry and two (2) pointers. In practice, the order n of the B+ tree data structure 500 would be in the hundreds, or thousands, etc. In this regard, while the exemplary embodiment of FIG. 5 shows the exemplary B+ tree data structure 500 having three levels of nodes (the root node 501 level, the internal node level 510, and the leaf node level 520 level), it is to be understood that at any given time, there can be zero (0) to N internal levels of nodes. For example, as is known in the art, a B+ tree data structure grows from the leaf nodes upwardly. In this regard, at some period of time, the B+ tree may only have leaf nodes, with zero (0) non-leaf nodes.

In the exemplary B+ tree data structure 500, each non-leaf node 501, 511, and 512 includes one or more keys (e.g., offset locations), and each leaf node 521, 522, 523, 524, and 525 includes one or more key:value pairs. Each key:value pair comprises a key (represented by a letter) whose value represents, e.g., a logical offset location of the data in volume, and a value "loc" which identifies (e.g., pointer) a physical location of the data in the physical storage space. The B+ tree data structure 500 is an indexing structure that is configured to organize the metadata items in a manner which enables efficient mapping and lookup functionality for metadata items and associated data blocks as identified in the leaf nodes 521, 522, 523, 524, and 525. In the exemplary embodiment of FIG. 5, the root node 501 comprises a key value J, with a pointer P1 to the internal node 511, and a pointer P2 to the internal node 512. The root node 501 comprises two empty key fields and two empty pointer fields, which can be used when new leaf nodes are added to the B+ tree data structure 500, resulting in a change in the structure of the inner nodes (root and internal nodes). The pointer P1 points to a branch of the B+ tree data structure 500 having nodes with key values that are less than the key value of J. The pointer P2 points to a branch of the B+ tree data structure 500 having nodes with key values that are greater than, or equal to, the key value J. More specifically, the pointer P1 points to the internal node 511, while the pointer P2 points to the internal node 512.

As further shown in FIG. 5, the internal node 511 comprises key values D and G, and pointers P3, P4, and P5. The internal node 511 includes one empty key field and one empty pointer field, which can be used when new leaf nodes are added to the B+ tree data structure 500. The pointer P3 points to the leaf node 521 having a plurality of key:value pairs (e.g., A:loc; B:loc; C:loc), with key values A, B and C which are less than the key value D. The pointer P4 points to the leaf node 522 having a plurality of key:value pairs (e.g., D:loc; E:loc; F:loc), with key values D, E, and F which are greater than or equal to the key value of D, but less than the key value of G. The pointer P5 points to the leaf node 523 having a plurality of key:value pairs (e.g., G:loc; H:loc; I:loc), with key values G, H, and I which are greater than or equal to the key value of G, but less than the key value J.

Furthermore, the internal node 512 comprises a key value M and pointers P6 and P7. The internal node 512 comprises two empty key fields and two empty pointer fields, which can be used when new leaf nodes are added to the B+ tree data structure 500. The pointer P6 points to the leaf node 524 having a plurality of key:value pairs (e.g., J:loc; K:loc; L:loc), with key values J, K, and L which are less than the key value M. The pointer P7 points to the leaf node 525 having a plurality of key:value pairs (e.g., M:loc; N:loc) with key values M and N which are greater than or equal to the key value M. The leaf node 525 comprises an empty data record, which can be used when new leaf nodes are added to the B+ tree data structure 500. The B+ tree data structure 500 comprises a dynamic multilevel indexing data structure which can grow and shrink as leaf nodes are added or removed from the B+ tree data structure. The B+ tree data structure grows from the bottom up by the addition of new leaf nodes when data is written to storage using B+ tree insertion methods well-known to those of ordinary skill in the art.

In some embodiments, to support swapping, the nodes of the B+ tree data structure 500 (core data structure) are divided into pages similar to the LSM tree data structure 400 (updates data structure) as discussed above. In particular, the inner nodes and the leaf nodes of the B+ tree data structure 500 can be constructed from swappable pages. Even at a granularity of 4 KB, a reasonable system should be able to contain all the inner nodes of the B+ tree data structure in RAM, requiring only a single read to retrieve required metadata.

The updates data structure (e.g., LSM tree data structure 400) is optimized for writes, and handles individual writes. The LSM tree data structure can have multiple values per key. Insertions into the LSM tree data structure are lightly buffered by the write cache. On the other hand, the core data structure (e.g., B+ tree data structure 500) is optimized for reads, and is configured to handle bulk writes of updated metadata. The B+ tree data structure may have a single value per key. Insertions into the B+ tree data structure are heavily buffered by the updates data structure.

In some embodiments, the size of the updates data structure (e.g., LSM tree data structure 400) is determined by a compromise between two competing factors: (i) read performance and (ii) write performance. In particular, read performance is the highest when there is no entry in the updates data structure. In this regard, to enhance the overall read performance of the primary metadata structure, it is preferable to keep the updates data structure as small as possible. On the other hand, the overall write performance is greatest with a large updates data structure, so that the number of pages to update in the core data structure is small in relation to the number of changes being applied to the core data structure from the updates data structure. In some embodiments, a balance between read and write performance is achieved by keeping the size of the updates data structure to be approximately 1% the size of the core data structure. However, the size difference will depend on several factors such as the page size and the metadata entry size.

As noted above, when an I/O write request is received by the storage control system, the I/O write data and associated metadata will be initially written to the persistent write cache, and the associated metadata is written to an in-memory buffer and then subsequently written to a root level (Level 0) segment of the LSM tree data structure (updates data structure) with other metadata entries in a sorted order (e.g., order of key value). The new/updated metadata entries which are written to a Level 0 segment of the LSM tree data structure will propagate down to the bottom level (Level N) of the LSM tree data structure as a result of merge operations. As metadata entries in segments are merged and propagate down the LSM tree data structure, older versions of metadata entries will be deleted when they are merged with newer versions of metadata entries having the same key value. In the LSM tree data structure, a group of segments in a given level i (which form a "merge set") are merged into a single segment in a next level i+1 of the LSM tree data structure. The number of segments that are merged together (i.e., number of segments in a merge set) is implementation specific. For example, in some embodiments, each merge set can include 2, 3, 4 or more segments, as desired for the given application.

The metadata entries in segments in the bottom level (Level N) of the LSM tree data structure are merged out from the LSM tree data structure and inserted into the B+ tree data structure (core data structure). In some embodiments, as noted above, metadata entries are inserted into the B+ tree data structure using standard B+ tree insertion operations. For example, the key:value entries (e.g., metadata entries) merged out from the bottom level of the LSM tree data structure are inserted into the B+ tree data structure, entry-by-entry, by traversing the B+ tree from root-to-leaf to insert a given entry in an appropriate leaf node based on the key value of the given entry.

The insertion of a given entry into the B+ tree data structure can result in the generation of a new leaf node, new inner nodes, and a new root node. For example, a given entry will be inserted into a given leaf node in increasing order only if there is no overflow. If there is an overflow (i.e., the leaf node contains the maximum number of entries), the leaf node is split into two leaf nodes, and the parent non-leaf (inner) node(s) are updated with the proper key values and pointers, as needed. If the insertion also results in the overflow of a parent non-leaf node, the B+ tree may need rebalancing by the addition of, e.g., new non-leaf nodes, new internal node levels, and/or a new root node.

In this regard, the insertion of key:value entries in the B+ tree data structure has a time complexity cost of O(logN). Moreover, if overwrites in place are avoided, the number of drive updates is O(logN) as well, because each insert updates the pointers in all the nodes from the leaf node (in which the entry was inserted) up to the root node of the B+ tree data structure. More specifically, the cost of an insertion operation is based on the costs associated with (i) traversing B+ tree down from root-to-leaf through the full height of the B+ tree data structure, (ii) inserting the new entry in the proper location in the leaf node (which requires finding the proper location and moving over the other entries to make room), (iii) persisting the path from root-to-leaf (if updates in place are not allowed), and (iv) rebalancing the B+ tree by adding a new leaf node, adding new internal nodes, adding a new internal level, etc., as needed, to comply with the specified "order" of a B+ tree data structure.

In some embodiments, optimized insertion techniques are utilized to improve the efficiency of inserting new/updated metadata entries from the LSM tree data structure (updates data structure) into a B+ tree data structure (core data structure). Instead of adding a single metadata entry into an existing B+ tree data structure using a standard insertion process as discussed above, an exemplary insertion process involves merging and sorting the metadata entries in bottom level segments of the LSM tree data structure with the metadata entries of leaf nodes of the existing B+ tree data structure, and constructing a new B+ tree data structure using the merged/sorted metadata entries. As the new B+ tree data structure is constructed, an intermediate state of the new B+ tree data structure is persisted and utilized for performing data access operations, in conjunction with the existing B+ tree data structure, as needed. As the new B+ tree data structure continuously grows towards completion, the previously existing B+ tree data structure continuously shrinks until it is completed deleted.

Exemplary optimized techniques for inserting metadata entries from an LSM tree data structure (updated data structure) to a B+ tree data structure (core data structure) will be discussed in further detail below in conjunction with FIGS. 6A, 6B, and 6C. It is to be noted the exemplary optimized insertion techniques as discussed below are enabled by unique characteristics of a primary metadata structure comprising a combination of the LSM tree data structure and B+ tree data structure. For example, the insertion of metadata entries from the LSM tree data structure into the B+ data structure is performed in bulk (~1% of the size of the B+). Furthermore, in many cases, the metadata entries to be inserted into the B+ tree data structure have consecutive key values (e.g., associated with consecutive writes to consecutive logical address locations) and, thus, the metadata entries are located in the same "area" of the B+ tree data structure. In addition, the metadata entries that are merged out from the LSM tree data structure are aggregated and sorted in order of key value, which facilitates the insertion operations.

Figure 6A:
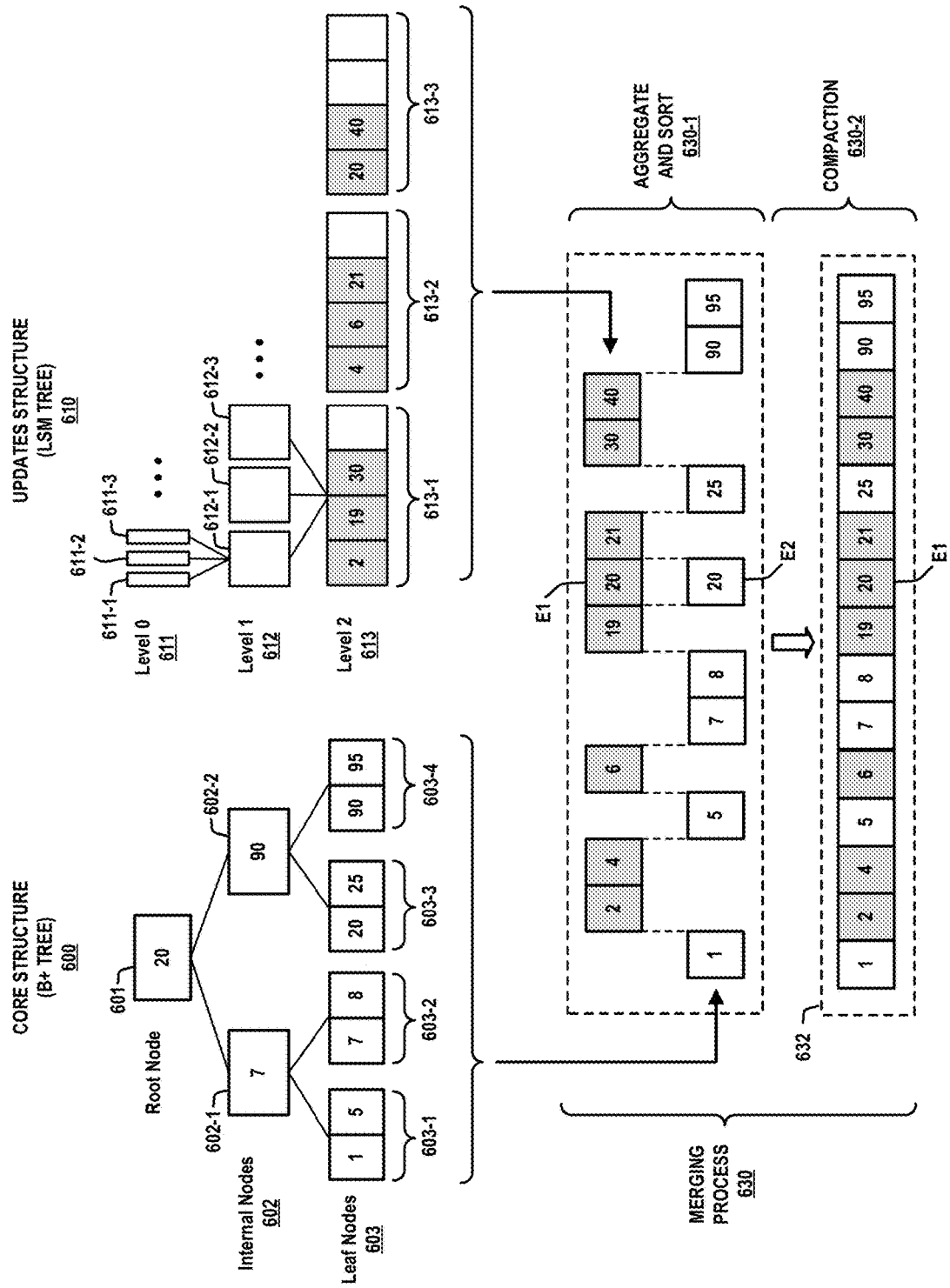
FIGS. 6A, 6B, and 6C schematically illustrate a process for managing insert operations of metadata entries in a storage metadata structure, according to an exemplary embodiment of the disclosure.
Figure 6B:
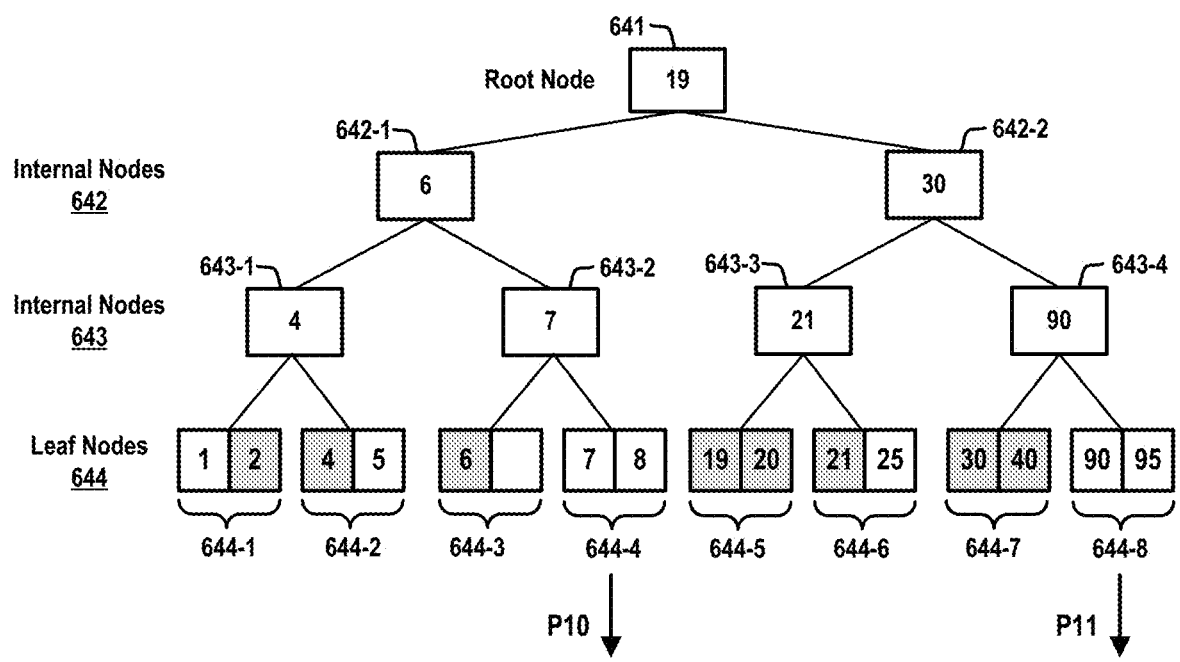
Figure 6C:
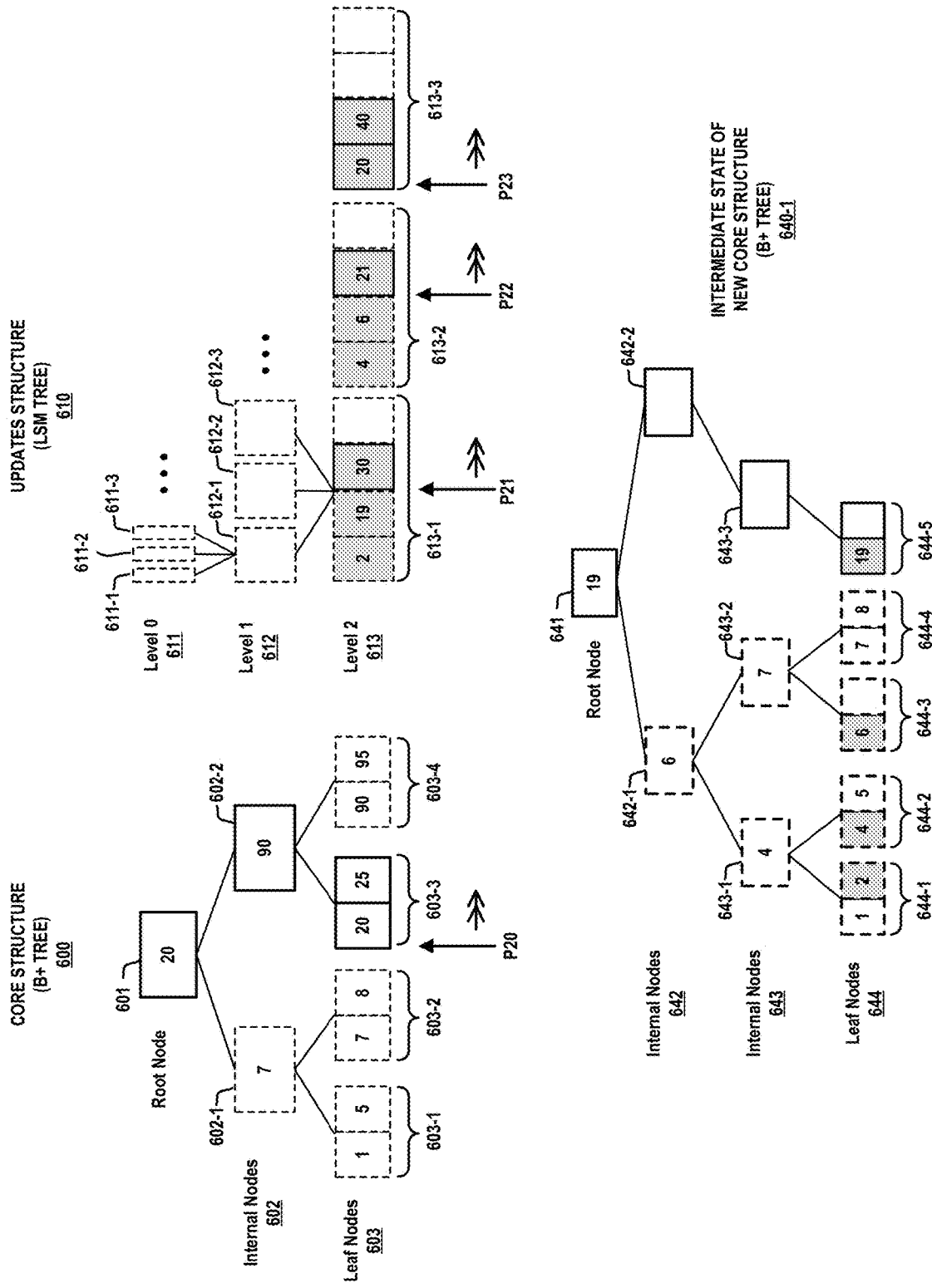

FIGS. 6A, 6B, and 6C schematically illustrate a process for managing insert operations of metadata entries in a storage metadata structure, according to an exemplary embodiment of the disclosure. More specifically, FIGS. 6A, 6B, and 6C schematically illustrate a process for inserting metadata entries from an LSM tree data structure (updated data structure) into a B+ tree data structure (core data structure), according to an exemplary embodiment of the disclosure. FIG. 6A schematically illustrates an exemplary B+ tree data structure 600 (core data structure) and an exemplary LSM tree data structure 610 (which collectively comprise a storage metadata structure), and an exemplary merging process 630 which is performed as part of an initial phase of the B+ tree insertion process, the details of which will be explained in further detail below.

The exemplary B+ tree data structure 600 comprises three levels of nodes including a root level comprising a root node 601, an internal node level 602, and a leaf node level 603. The internal node level 602 comprises two internal nodes 602-1 and 602-2, and the leaf node level 603 comprises leaf nodes 603-1, 603-2, 603-3, and 603-4. For ease of illustration and explanation, the exemplary B+ tree data structure 600 is shown to include four leaf nodes, wherein each leaf node comprises two metadata entries which are sorted in order based on numerical key values of the metadata entries.

For example, the first leaf node 603-1 comprises two metadata entries with key values 1 and 5 that are sorted in order of key value, the second leaf node 603-2 comprises two metadata entries with key values 7 and 8 that are sorted in order of key value, the third leaf node 603-3 comprises two metadata entries with key values 20 and 25 that are sorted in order of key value, and the fourth leaf node 603-4 comprises two metadata entries with key values 90 and 95 that are sorted in order of key value. The root node 601 has a key value of 20, and the internal nodes 602-1 and 602-2 have respective key values 7 and 90, which collectively provide a multilevel index to traverse the B+ tree data structure from root-to-leaf along a target path to a leaf node that has a target key value, using techniques as discussed above in conjunction with FIG. 5.

The exemplary LSM tree data structure 610 comprises a plurality of segment levels, e.g., Level 0, Level 1, and Level 2. In particular, a root level (Level 0) comprises a plurality of Level 0 segments 611 which include segments 611-1, 611-2, and 611-3, etc. A next level (Level 1) comprises a plurality of Level 1 segments 612 which include segments 612-1, 612-2, and 612-3, etc. A last level (Level 2) comprises a plurality of Level 2 segments 613 (or leaf segments) which include segments 613-1, 613-2, and 613-3, etc. For ease of illustration and explanation, the exemplary LSM tree data structure 610 is shown to have three Level 2 segments (leaf segments) where each leaf segment includes metadata entries which are sorted in order based on numerical key values of the metadata entries. For example, the leaf segment 613-1 comprises three metadata entries with key values 2, 19, and 30 sorted in order of key value, the leaf segment 613-2 comprises three metadata entries with key values 4, 6, and 21 sorted in order of key value, and the leaf segment 613-3 comprises two metadata entries with key values 20 and 40 sorted in order of key value. In addition, for purposes of illustration, the metadata entries in the leaf segments of the LSM tree data structure 610 are shaded, while the metadata entries in the leaf nodes of the B+ tree data structure 600 are unshaded.

In an exemplary non-limiting embodiment, FIG. 6A schematically illustrates a group of segments in a given level i (which form a "merge set") are merged into a single segment in a next level i+1 of the LSM tree data structure, wherein there are 3 segments in a merge set. For example, FIG. 6A schematically illustrates that the segments 611-1, 611-2, and 611-3 in Level 0 form a "merge set" whose metadata entries are merged and sorted in the segment 612-1 in Level 1, and that the segments 612-1, 612-2, and 612-3 in Level 1 form a "merge set" whose metadata entries are merged and sorted in the leaf segment 613-1 in Level 2.

Furthermore, FIG. 6A illustrates an exemplary merging process 630 which comprises a sorting process 630-1 and a compaction process 630-2. In some embodiments, the sorting process 630-1 is a logical process which comprises (i) iterating over the metadata entries of the leaf segments 613-1, 613-2, and 613-3 (e.g., merge set) of the LSM tree data structure 610 to aggregate and sort such metadata entries in order of key value, and (ii) iterating over the sorted metadata entries of the leaf nodes 603 (e.g., leaf nodes 603-1, 603-2, 603-3, and 603-4) of the B+ tree data structure 600, to thereby aggregate and sort, in order of key value, the metadata entries of the leaf nodes 603 of the B+ tree data structure 600 with the sorted metadata entries of the leaf segments 613-1, 613-2, and 613-3 of the LSM tree data structure 610.

Further, in some embodiments, the compaction process 630-2 is a logical process which comprises (i) identifying metadata entries (in the aggregated and sorted set of metadata entries) having the same key value, and (ii) deleting older versions of metadata entries having respective key values that match respective key values of newest versions of the metadata entries. For example, in the exemplary embodiment of FIG. 6A, an LSM metadata entry E1 with the key value of "20" (shaded entry) is deemed the newest updated version of a B+ tree metadata entry E2 with the same key value of "20" (unshaded entry). Therefore, as a result of the logical compaction process 630-2, the B+ tree metadata entry E2 with the key value of "20" is deleted, and not included in a logical sorting of metadata entries 632, which results from the merging process 630 (i.e., the newest metadata entry E1 overwrites the older metadata entry E2 with the same key value of "20."

In FIG. 6A, it is to be understood that the logical sorting of metadata entries 632 is not a physical structure that is generated, but rather the logical sorting of metadata entries 632 represents a logical merging, sorting, and compacting of the metadata entries in the leaf nodes and leaf segments of the respective B+ tree data structure 600 and the LSM tree data structure 610, wherein the logical storing of metadata entries 632 is determined as the merging process iterates in order through the leaf segments and leaf nodes of the LSM and B+ tree data structures. The logical ordering of metadata entries 632 is utilized to generate new leaf nodes of a new B+ tree data structure, wherein the logically sorted metadata entries 632 are added to respective leaf nodes of the new B+ tree data structure.

As new leaf nodes are added to the new B+ tree data structure, the tree building process progressively constructs new root and internal nodes to generate a balanced B+ tree structure according to the prespecified "order" of the B+ tree. It is to be noted that in some embodiments, as explained in further detail below, the process of constructing the new B+ tree data structure begins at some point before completion of the merging process 630, wherein the merging process 630 continues to iterate over the metadata entries of the leaf segment and leaf nodes of the B+ tree data structure 600 and LSM tree data structure 610, in order, to merge/sort/compact the metadata entries into the logically sorted metadata entries 632 which are used to populate the new leaf nodes of the new B+ tree structure.

FIG. 6B schematically illustrates a new B+ tree data structure 640 which is generated at a completion of the insertion process in which the metadata entries in the leaf levels (e.g., leaf nodes and leaf segments) of the previous B+ tree data structure 600 and the LSM tree data structure 610 are merged into leaf nodes of the new B+ tree data structure 640, according to an exemplary embodiment of the disclosure. The new B+ tree data structure 640 (core data structure) comprises four levels of nodes including a root level comprising a root node 641, internal node levels 642 and 643, and a leaf node level 644. The internal node level 642 comprises two internal nodes 642-1 and 642-2, and the internal node level 643 comprises four internal nodes 643-1, 643-2, 643-3, and 643-4. The leaf node level 644 comprises leaf nodes 644-1, 644-2, 644-3, 644-4, 644-5, 644-6, 644-7, and 644-8 (collectively, leaf nodes 644). The leaf nodes 644 include metadata entries from the logical set of sorted/merged/compacted metadata entries 632 of FIG. 6A. The root node 641 and internal nodes 642 and 643 have the key values as shown in FIG. 6B which are needed to provide a multilevel index to traverse the new B+ tree data structure 640 from root-to-leaf along a target path to a leaf node that has a target key value, using techniques as discussed above in conjunction with FIG. 5. At the completion of a background process comprising the merging process and B+ tree construction process, the primary storage metadata structure is updated to comprise the updated LSM tree data structure 610 (with the merged leaf segments removed) and the new B+ tree data structure 640 in place of the previous B+ tree data structure 600.

In some embodiments, the new B+ tree data structure 640 reuses unmodified areas of the previous B+ tree data structure 600. More specifically, in some embodiments, unmodified leaf nodes in the previous B+ tree data structure 600 can be reused in the new B+ tree data structure 640. For example, the new leaf node 644-4 of the new B+ tree data structure 640 comprises the same metadata entries (with key values 7 and 8) as the leaf node 603-2 of the previous B+ tree data structure 600. Similarly, the new leaf node 644-8 in the new B+ tree data structure 640 comprises the same metadata entries (with key values 90 and 95) as the leaf node 603-4 of the previous B+ tree data structure 600. In this regard, as part of the merging and insertion process, the new leaf node 644-4 of the new B+ tree data structure 640 can have a pointer P10 which points to the location of the metadata entries of the previous leaf node 603-2. Similarly, the new leaf node 644-8 can have a pointer P11 which points to the location of the metadata entries of the previous leaf node 603-4.

The reuse of the leaf nodes 603-2 and 603-4 of the previous B+ tree data structure 600 eliminates the need to read and rewrite the unmodified metadata entries of the leaf nodes 603-2 and 603-4 to new locations for the new leaf nodes 644-4 and 644-8 of the new B+ tree data structure 640. This is particularly advantageous in data storage systems where data is not randomly written over an entire dataset (or entire write space), but rather the active dataset is a relatively much smaller portion (e.g., 5%-10%) of the entire dataset. In this regard, it is expected that a large number of leaf nodes of the previous B+ tree data structure 600 will be reused (pointed to) by the new B+ tree data structure 640, and thereby eliminating the need to read and rewrite a large amount of metadata entries of unmodified leaf nodes of the previous B+ tree data structure 600 to new locations.

As noted above, the background process of constructing the new B+ tree data structure 640 begins at some point during the merging process 630 to gradually construct the new B+ tree data structure 640. The new B+ tree data structure 640 is constructed as the merging process 630 continues to iterate over, in order, the metadata entries of the leaf segments and leaf nodes of the previous B+ tree data structure 600 and the LSM tree data structure 610, to merge/sort/compact the metadata entries into the logical sorting of metadata entries 632 which is used to populate new leaf nodes of the new B+ tree data structure 640 as it is constructed. As the new B+ tree data structure 640 is gradually constructed in the background, the metadata management system tracks the progress of the merging process 630 and the construction of the new B+ tree data structure 640 by using pointers that point to (i) metadata entries in the leaf nodes of the previous B+ tree data structure 600 and (ii) metadata entries in leaf segments of the LSM tree data structure 610. At any given point in time, the pointers provide an indication of the progress of the insertion process and which metadata entries have not yet been merged into new leaf nodes of the new B+ tree data structure 640.

For example, FIG. 6C schematically illustrates a point in time during the merging process and the B+ tree construction process in which the metadata entries with key values less than 20 have been merged into new leaf nodes of the B+ tree being constructed, while the metadata entries with key values of 20 or greater are still present and accessible in the leaf levels of the previous B+ tree data structure 600 and LSM tree data structure 610. More specifically, FIG. 6C shows a plurality of pointers P20, P21, P22, and P23 which point to locations in the respective leaf nodes and leaf segments the previous B+ tree data structure 600 and the LSM tree data structure 610. The pointer P20 points to a metadata entry (with key value 20) in the leaf node 603-3 of the previous B+ tree data structure 600. The pointer P21 points to a metadata entry (with key value 30) in the leaf segment 613-1 of the LSM tree data structure 610. The pointer P22 points to a metadata entry (with key value 21) in the leaf segment 613-2 of the LSM tree data structure 610. The pointer P23 points to a metadata entry (with key value 20) in the leaf segment 613-3 of the LSM tree data structure 610.

Collectively, the pointers P20, P21, P22, and P23 allow the metadata management system to track the progress of the background merging process. For example, since the metadata entries of the leaf nodes 603-1, 603-2, 603-3, and 603-4 of the previous B+ tree data structure 600 are sorted in order of key value within each leaf node and across the leaf nodes 603-1, 603-2, 603-3, and 603-4, the pointer P20 provides an indication (at a given point in time) that the metadata entries of key value 20 and greater have not yet been merged and added to new leaf nodes of the new B+ tree data structure 640. Further, the pointers P21, P22, and P23 provide an indication (at the given point in time) of the metadata entries in the respective leaf segments 613-1, 613-2, and 613-3 which have not yet been merged and added to new leaf nodes of the new B+ tree data structure 640.

In addition, FIG. 6C illustrates an intermediate state 640-1 of the new B+ tree data structure 640 (FIG. 6B) at a given point of time in which metadata entries of the logically sorted metadata entries 632 with key values of 19 or less have been added to the new leaf nodes 644-1, 644-2, 644-3, 644-4, and 644-5 of the partially built new B+ tree data structure 640. In FIG. 6C, the intermediate state 640-1 of the new B+ tree data structure 640 comprises a balanced B+ tree data structure in which the internal nodes 642-2 and 643-3 are partially constructed to provide a path from the root node 641 to the metadata entry of key value 19 in the new leaf node 644-5.

As the merging process 630 continues, the intermediate state of the new B+ tree data structure 640 gradually changes over time as new leaf nodes and internal nodes are added to the partially constructed B+ tree data structure, until the merging process 630 is complete, resulting in the new B+ tree data structure 640 shown in FIG. 6B. As the new B+ tree data structure 640 is gradually built over time, portions of the previous B+ tree data structure which are no longer needed can be deleted and the corresponding memory deallocated.

During the merging process and new B+ tree construction process, the storage control system may receive an I/O read request to access a target data item. The metadata management system can utilize the previous B+ tree data structure 600, the LSM tree data structure 610, and the intermediate state 640-1 of the new B+ tree data structure, as needed, to search for a target metadata item that corresponds to the target data item to be accessed. In particular, since the metadata manager tracks the progress of the merging and tree construction process using pointers which identify the current key value of the metadata item being merged, a lookup for a target metadata item, which has a key value which is less than the current key value of the metadata item being merged, is performed using the LSM tree data structure 610 and the intermediate state of the new B+ tree data structure 640. On the other hand, a lookup for a target metadata item, which has a key value which is equal to or greater than the current key value of the metadata item being merged, is performed using the LSM tree data structure 610 and the previous B+ tree data structure 600.

For example, for the given point in time shown in FIG. 6C, to serve an I/O read request for a data item associated with a metadata item having a key value 25, the metadata management system knows that the current metadata item with the key value of 20 is still being merged into the new B+ tree data structure 640. Therefore, the storage control system will perform a lookup operation in the LSM tree data structure 610 to search for a metadata entry with a key value 25 (i.e., to determine if the LSM tree data structure 610 comprises a newest metadata entry with the key value of 25), and then search the previous B+ tree data structure 600 to access the metadata entry with the key value of 25 in the leaf node 603-3, if a newer metadata entry with a key value of 25 is not found in the LSM tree data structure 610.

On the other hand, to serve an I/O read request for a data item associated with a metadata item having a key value of 8, the metadata management system knows that the current metadata item with the key value of 20 is still being merged into the new B+ tree data structure 640 and, consequently, the metadata management system knows that the previous B+ tree data structure 600 no longer has a metadata entry with the key value of 8. Therefore, the storage control system will perform a lookup operation in the LSM tree data structure 610 to search for a metadata entry with a key value of 8 (i.e., to determine if the LSM tree data structure 610 comprises a newest metadata entry with a key value of 8), and then search the intermediate state 640-1 of the new B+ tree data structure 640 to access the metadata entry with the key value of 8 in the new leaf node 644-4, if a newer metadata entry with a key value of 8 is not found in the LSM tree data structure 610.

It is to be appreciated that the merging process and new B+ tree construction process are not memory intensive operations, but rather utilize a relatively small amount system RAM memory to run. At any given point in time, such processes utilize the system RAM to store (i) the current metadata entries in the leaf segments of the LSM tree data structure 610 that are being scanned for the sorting/compacting process, (ii) the leaf node(s) in the previous B+ tree data structure 600 which are being scanned, along with the internal nodes along the paths from such leaf node(s) to the root node of the previous B+ tree data structure, and (iii) the active leaf node in the new B+ tree data structure 640 to which metadata entries are being added, along with the internal nodes along the path from the active leaf node to the root node of the new B+ tree data structure.

By way of example, FIG. 6C schematically illustrates elements (with solid lines) of the previous B+ tree data, the LSM tree data structure 610, and the intermediate state 640-1 of the new B+ tree data structure 640, which reside in system RAM at a given point in time, and elements (with dashed lines) of such tree structures which do not reside in the system RAM at the given point in time. More specifically, FIG. 6C shows that the leaf node 603-3, the internal node 602-2, and the root node 601 of the previous B+ tree data structure 600 reside in system RAM at the given point in time, while all other elements of the previous B+ tree data structure 600 do not reside in system RAM at the given point in time. In addition, FIG. 6C shows that the metadata entries (e.g., with key values of 30, 21, 20, and 40) in the leaf segments 613-1, 613-2, and 613-2 of the LSM tree data structure 610 reside in system RAM at the given point in time, while all other elements of the LSM tree data structure 610 do not reside in system RAM at the given point in time. Moreover, FIG. 6C shows that the new leaf node 644-5, the internal nodes 642-2 and 643-3, and the root node 641 of the intermediate state 640-1 of the new B+ tree data structure 640 reside in system RAM at the given point in time, while all other elements of the intermediate state 640-1 of the new B+ tree data structure 640 do not reside in system RAM at the given point in time.

The minimal utilization of system RAM for the merging and new B+ tree construction processes is due to the fact that the merging of the sorted metadata entries into new leaf nodes of the new B+ tree data structure is a sequential process. Accordingly, at any given point in time, the merging process only needs (i) a page from each leaf segment of the LSM tree data structure 610, (ii) pages for the active leaf nodes (currently being merged) of the previous and new B+ tree data structures, (iii) and information regarding the root-to-leaf paths for the active leaf nodes in the previous and new B+ tree data structures.

It is to be appreciated that the exemplary process for inserting metadata entries of an LSM tree data structure into a B+ tree data structure as schematically shown in FIGS. 6A, 6B, and 6C, provides an optimized insertion process, as compared to standard B+ tree insertion methods, for various reasons. For example, with the exemplary process shown in FIGS. 6A-6C, there is no need to traverse the height of a B+ tree data structure for each metadata entry being inserted into the B+ tree data structure from the LSM tree data structure. In addition, there is no need to search within leaf nodes of a B+ tree data structure to add metadata entries into the leaf nodes. Further, the insertion of metadata entries into a B+ tree data structure does not result in node splits which requires rebalancing of a B+ tree data structure. In contrast, new internal nodes of a new B+ tree data structure are simple created as the sorted metadata items are added to new leaf nodes in a sequential order.

Moreover, the merging and B+ tree construction operations are permed by a background process that does not adversely impact the response time of serving I/O write and read requests. Indeed, during the background process, the LSM tree data structure is used to store new metadata entries associated with new I/O write requests. In addition, the LSM tree data structure, the previous B+ tree data structure, and the intermediate state of the new B+ tree data structure can be utilized during the background process to search for target metadata entries associated with I/O read requests. This is made possible since the merging process and intermediate state of the new B+ tree data structure are continuously persisted at points in time as the background process progresses, while allowing the release of those portions of the LSM tree data structure 610 and the previous B+ tree data structure 600 which have been merged into the new B+ tree data structure 640 under construction. In other words, the current state of the background process is persisted, which allows the pages that have been merged into the new B+ tree data structure to be released. As noted above, persisting the state of the background process is achieved by temporarily persisting the previous and new B+ tree structures, and persisting the key value at which to resume the merge operation in the event of crash.

Figure 7:
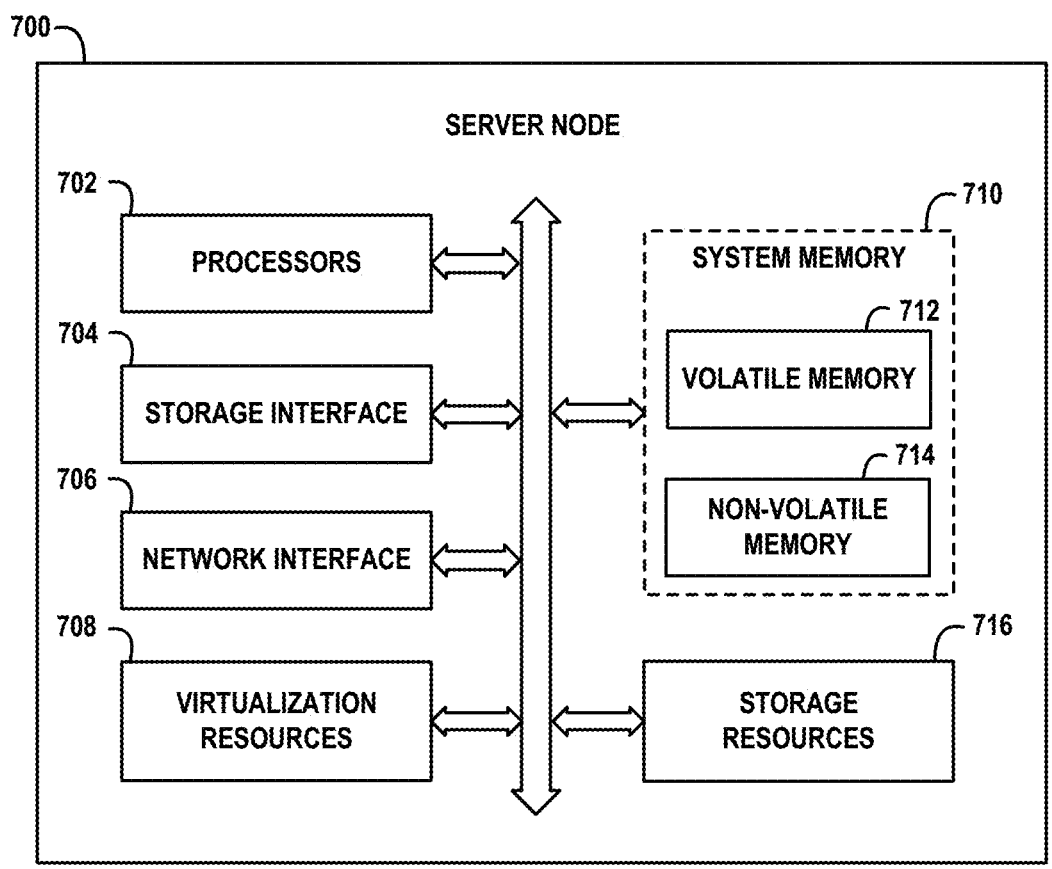
FIG. 7 schematically illustrates a framework of a server node for hosting a storage node which comprises a metadata management system, according to an exemplary embodiment of the disclosure.

FIG. 7 schematically illustrates a framework of a server node for hosting a storage node which comprises a metadata management system, according to an exemplary embodiment of the disclosure. The server node 700 comprises processors 702, storage interface circuitry 704, network interface circuitry 706, virtualization resources 708, system memory 710, and storage resources 716. The system memory 710 comprises volatile memory 712 and non-volatile memory 714. The processors 702 comprise one or more types of hardware processors that are configured to process program instructions and data to execute a native operating system (OS) and applications that run on the server node 700.

For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities of a storage control system and a metadata management system as discussed herein. In some embodiments, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host system. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well as to execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage nodes and storage control systems as discussed herein, as well as the metadata management methods as discussed herein, are implemented using program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile memory 712 is configured as the highest-level memory tier, and the non-volatile memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    managing, by a storage control system, a storage metadata structure which comprises metadata entries associated with stored data items, wherein the storage metadata structure comprises a first tree data structure and a second tree data structure, wherein the first tree data structure is configured to accumulate metadata entries associated with newly written data items, and sort the accumulated metadata entries by index keys, and wherein the second tree data structure is configured to organize metadata entries using an index structure that enables random-access to the metadata entries using the index keys;
    performing, by the storage control system, a merging process to merge metadata entries in a leaf level of the first tree data structure and a leaf level of the second tree data structure;
    performing, by the storage control system, a tree construction process to construct a third tree data structure by populating a leaf level of the third tree data structure with merged metadata entries from the leaf levels of the first and second tree data structures; and
    updating, by the storage control system, the storage metadata structure to comprise the first tree data structure, and the third tree data structure in place of the second tree data structure.

2. The method of claim 1, wherein the second tree data structure and the third tree data structure each comprise a same type of tree data structure.

3. The method of claim 2, wherein:
    the first tree data structure comprises a log-structured merge tree data structure; and
    the second tree data structure and the third tree data structure each comprise a B+ tree data structure.

4. The method of claim 1, wherein performing the merging process comprises:
    iterating over metadata entries in the leaf levels of the first and second tree data structures to logically sort the metadata entries in an order of key value; and
    deleting older versions of metadata entries having key values that match key values of respective newer versions of metadata entries.

5. The method of claim 1, wherein the merging process and the tree construction process are concurrently performed as part of a background process.

6. The method of claim 5, wherein the storage metadata structure is updated to comprise the first tree data structure, and the third tree data structure in place of the second tree data structure, in response to completion of the background process.

7. The method of claim 5, further comprising:
    persisting, by the storage control system, a state of the background process at points in time during operation of the background process;
    wherein persisting the state of the background process comprises utilizing, by the storage control system, a plurality of pointers that point to locations in the leaf levels of the first and second tree data structure, wherein the plurality of pointers are configured to provide an indication, at a given point in time, of which metadata entries in the leaf levels of the first and second tree data structures have not yet been added to the leaf level of the third tree data structure.

8. The method of claim 7, wherein persisting the state of the background process comprises persisting, by the storage control system, an intermediate structure of the third tree data structure.

9. The method of claim 8, further comprising utilizing, by the storage control system, the first tree data structure, the second tree data structure, and the intermediate structure of the third tree data structure to perform a lookup operation for a metadata entry at the given point in time during operation of the background process.

10. The method of claim 1, wherein performing the tree construction process to construct the third tree data structure by populating a leaf level of the third tree data structure with merged metadata entries from the leaf levels of the first and second tree data structures comprises adding a pointer in the leaf level of the third tree data structure which points to an unmodified portion of the leaf level of the second tree data structure.

11. An article of manufacture comprising a non-transitory processor-readable storage medium having stored therein program code of one or more software programs, wherein the program code is executable by one or more processors to implement a method which comprises:
    managing, by a storage control system, a storage metadata structure which comprises metadata entries associated with stored data items, wherein the storage metadata structure comprises a first tree data structure and a second tree data structure, wherein the first tree data structure is configured to accumulate metadata entries associated with newly written data items, and sort the accumulated metadata entries by index keys, and wherein the second tree data structure is configured to organize metadata entries using an index structure that enables random-access to the metadata entries using the index keys;

performing, by the storage control system, a merging process to merge metadata entries in a leaf level of the first tree data structure and a leaf level of the second tree data structure;

performing, by the storage control system, a tree construction process to construct a third tree data structure by populating a leaf level of the third tree data structure with merged metadata entries from the leaf levels of the first and second tree data structures; and updating, by the storage control system, the storage metadata structure to comprise the first tree data structure, and the third tree data structure in place of the second tree data structure.

12. The article of manufacture of claim 11, wherein:
the first tree data structure comprises a log-structured merge tree data structure; and
the second tree data structure and the third tree data structure each comprise a B+ tree data structure.

13. The article of manufacture of claim 11, wherein the program code for performing the merging process comprises program code for:
iterating over metadata entries in the leaf levels of the first and second tree data structures to logically sort the metadata entries in an order of key value; and
deleting older versions of metadata entries having key values that match key values of respective newer versions of metadata entries.

14. The article of manufacture of claim 11, wherein:
the merging process and the tree construction process are concurrently performed as part of a background process; and
the storage metadata structure is updated to comprise the first tree data structure, and the third tree data structure in place of the second tree data structure, in response to completion of the background process.

15. The article of manufacture of claim 14, further comprising program code that is executable by the one or more processors to implement a method which comprises:
persisting, by the storage control system, a state of the background process at points in time during operation of the background process;
wherein persisting the state of the background process comprises utilizing, by the storage control system, a plurality of pointers that point to locations in the leaf levels of the first and second tree data structure, wherein the plurality of pointers are configured to provide an indication, at a given point in time, of which metadata entries in the leaf levels of the first and second tree data structures have not yet been added to the leaf level of the third tree data structure; and
wherein persisting the state of the background process comprises persisting, by the storage control system, an intermediate structure of the third tree data structure.

16. The article of manufacture of claim 15, further comprising program code for utilizing, by the storage control system, the first tree data structure, the second tree data structure, and the intermediate structure of the third tree data structure to perform a lookup operation for a metadata entry at the given point in time during operation of the background process.

17. The article of manufacture of claim 11, wherein the program code for performing the tree construction process to construct the third tree data structure by populating a leaf level of the third tree data structure with merged metadata entries from the leaf levels of the first and second tree data structures comprises program code for adding a pointer in the leaf level of the third tree data structure which points to an unmodified portion of the leaf level of the second tree data structure.

18. An apparatus comprising:
at least one processor; and
memory configured to store program code, wherein the program code is executable by the at least one processor to instantiate a storage control system, wherein the storage control system is configured to:
manage a storage metadata structure which comprises metadata entries associated with stored data items, wherein the storage metadata structure comprises a first tree data structure and a second tree data structure, wherein the first tree data structure is configured to accumulate metadata entries associated with newly written data items, and sort the accumulated metadata entries by index keys, and wherein the second tree data structure is configured to organize metadata entries using an index structure that enables random-access to the metadata entries using the index keys;
perform a merging process to merge metadata entries in a leaf level of the first tree data structure and a leaf level of the second tree data structure;
perform a tree construction process to construct a third tree data structure by populating a leaf level of the third tree data structure with merged metadata entries from the leaf levels of the first and second tree data structures; and
update the storage metadata structure to comprise the first tree data structure, and the third tree data structure in place of the second tree data structure.

19. The apparatus of claim 18, wherein:
the first tree data structure comprises a log-structured merge tree data structure; and
the second tree data structure and the third tree data structure each comprise a B+ tree data structure.

20. The apparatus of claim 18, wherein:
the storage control system is configured to concurrently perform the merging process and the tree construction process as part of a background process;
the storage control system is configured to update the storage metadata structure to comprise the first tree data structure, and the third tree data structure in place of the second tree data structure, in response to completion of the background process;
the storage control system is configured to persist a state of the background process at points in time during operation of the background process;
wherein in persisting the state of the background process, the storage control system is configured to:
utilize a plurality of pointers that point to locations in the leaf levels of the first and second tree data structure, wherein the plurality of pointers are configured to provide an indication, at a given point in time, of which metadata entries in the leaf levels of the first and second tree data structures have not been added to the leaf level of the third tree data structure; and
persist an intermediate structure of the third tree data structure.

* * * * *